No. 862,191. PATENTED AUG. 6, 1907.
P. M. ORLOPP.
TROLLEY WHEEL.
APPLICATION FILED JULY 12, 1906.

2 SHEETS—SHEET 1.

Witnesses:
F. C. Dyne
L. B. Woerner.

Inventor,
Piatt M. Orlopp,
By Minturn & Woerner,
Attorneys.

No. 862,191. PATENTED AUG. 6, 1907.
P. M. ORLOPP.
TROLLEY WHEEL.
APPLICATION FILED JULY 12, 1906.

2 SHEETS—SHEET 2.

Witnesses;
J. C. Dynir
L. B. Woerner.

Inventor,
Piatt M. Orlopp,
By
Minturn & Woerner,
Attorneys.

UNITED STATES PATENT OFFICE.

PIATT M. ORLOPP, OF INDIANAPOLIS, INDIANA.

TROLLEY-WHEEL.

No. 862,191.  Specification of Letters Patent.  Patented Aug. 6, 1907.

Application filed July 12, 1906. Serial No. 325,846.

*To all whom it may concern:*

Be it known that I, PIATT M. ORLOPP, a citizen of the United States, residing at Indianapolis, in the county of Marion and State of Indiana, have invented certain new and useful Improvements in Trolley-Wheels, of which the following is a specification.

The object of this invention is to provide a trolley wheel in which the rim is flexibly connected to the hub so that in going around curves the rim will angle with relation to the hub and thereby follow the wire more closely than if the rim and hub were rigidly connected.

The object also is to provide a wheel in which the rim and hub are readily detachable, thereby permitting either of said parts to be renewed when worn or broken without renewing the other, should the latter be in good condition.

A further object of the invention is to provide an elastic connection between the rim and the hub which will cause the rim to respond more quickly to any depressions or irregularities in the trolley wire such as occurs at switch posts or angle ears, than would be possible with a trolley wheel held in position solely by the spring pressed trolley pole of usual construction.

A further object of the invention is to provide a rim which is elastically supported from the hub so as to take the hum off of the top of the car, now occurring with the one-piece trolley wheels in common use, and the object is further to provide a flexible wheel which will lessen the grind on the trolley wire occasioned by the rigid wheel now in common use.

The object is to provide a simple inexpensive and durable wheel such as will be hereinafter fully described, and the novel features of which will be pointed out in the appended claims.

Figure 1:
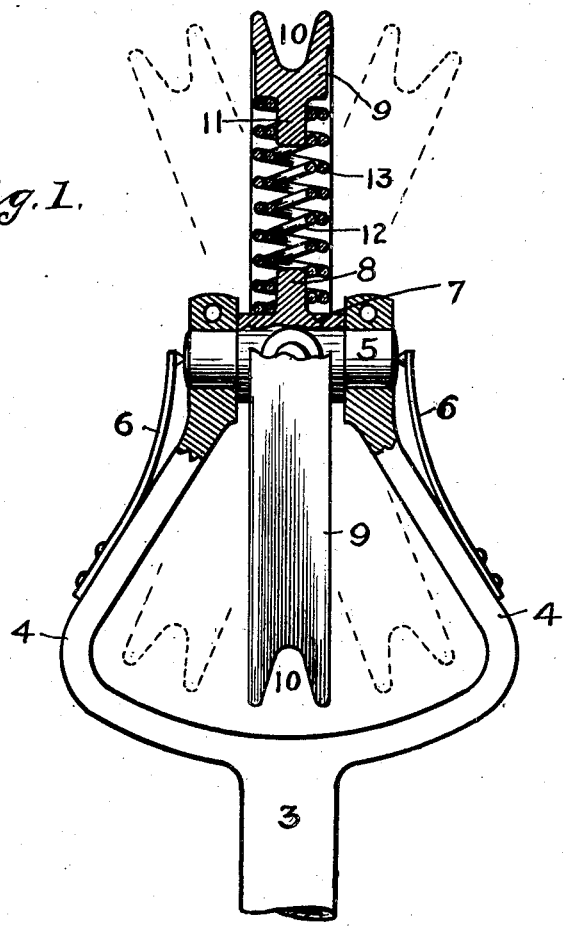
Figure 2:
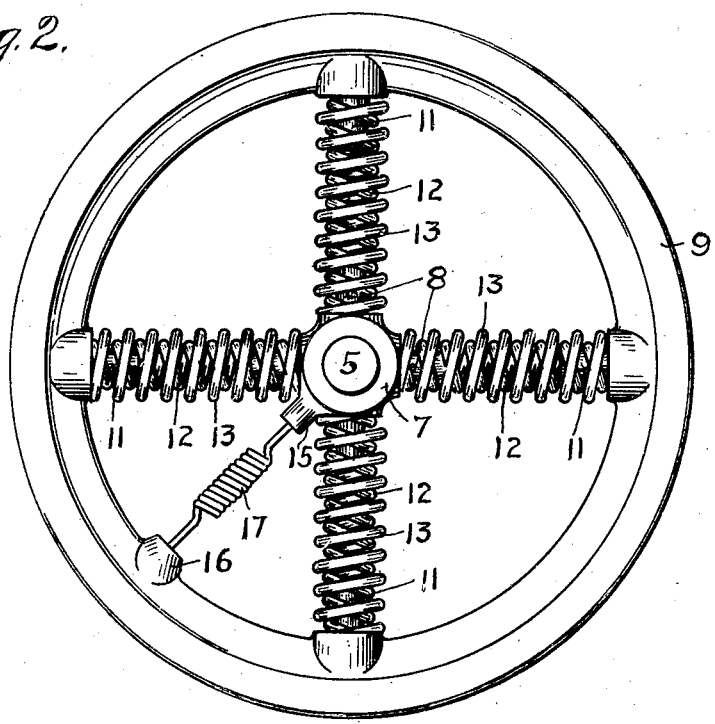

I accomplish the objects of the invention by the mechanism illustrated in the accompanying drawings, in which—
Figure 1 is a front elevation in partial vertical section of my invention and Fig. 2 is a detail in side view of same removed from the supporting frame or harp.

Like characters of reference indicate like parts throughout the two views.
3 is the trolley pole, 4 the harp on the end of the pole and 5 the shaft on which the trolley wheel is mounted.

6 are springs on opposite sides of the harp having points which enter center holes in the ends of the shaft 5 and prevent displacement of the shaft.

7 is a hub mounted on the shaft 5. It has a series of radial lugs 8, here shown as four in number placed equidistant around the hub 7.

9 is an annular rim having the outside groove 10 to receive the trolley wire and it has the inside radial lugs 11 on corresponding radial lines with the lugs 8. The rim 9 is supported from the hub 7 by means of the spirally wound springs 12 and 13. The spring 12 is held in position by the lugs 8 and 11 which enter the ends of the spring. The spring 13 surrounds the spring 12 and is held in place by the spring 12 and is wound in opposite direction from spring 12 in order to counteract the lateral movement or tendency of the first spring 12 which would not cause the rim to return to a normal position at right angles to the shaft 5 with the same certainty as where the two oppositely wound springs are used.

To carry the electric current from the rim to the hub, I prefer, instead of relying on the springs 12 and 13 to provide the conducting wire 17, one end of which is electrically connected with the lug 15 on the hub 7 and the other end with the lug 16 on the rim 9.

The construction of my improved trolley wheel is so simple and the advantages so manifest that further description and explanation is unnecessary, and

What I claim as new and wish to secure by Letters Patent of the United States, is—

1. In a trolley wheel a hub having radial lugs, a rim having inside radial lugs and spirally wound springs in pairs connecting the rim with the hub, the springs of each pair being oppositely wound and assembled with one spring inside of the other the ends of said springs being held by respective lugs of the hub and rim.

2. In a trolley wheel a shaft, a hub mounted on said shaft, radial lugs on said hub, an externally grooved rim concentric with said hub, said rim having an inside radial lug opposite each of the lugs of the hub, a spirally wound spring connecting each lug of the hub with a corresponding lug of the rim and a second oppositely wound spring surrounding each of the first-mentioned springs.

3. In a trolley head a shaft, a harp supporting said shaft, springs pressing against the ends of said shaft, a hub mounted between the sides of the harp on said shaft, said hub having a series of equidistant radial lugs, a rim having an externally grooved periphery concentric with said hub having inside radial lugs corresponding with the lugs on the hub, spirally wound springs connecting a lug of the hub with a corresponding lug of the rim and a second spring wound in opposite direction to the first-named spring surrounding each of said first-named springs.

In witness whereof, I have hereunto set my hand and seal at Indianapolis, Indiana, this, 3rd day of July, A. D. one thousand nine hundred and six.

PIATT M. ORLOPP. [L. S.]

Witnesses:
J. A. MINTURN,
F. W. WOERNER.